H. A. ZOPFF.
APPARATUS FOR MAKING COFFEE.
No. 50,412.
PATENTED OCT. 10, 1865.
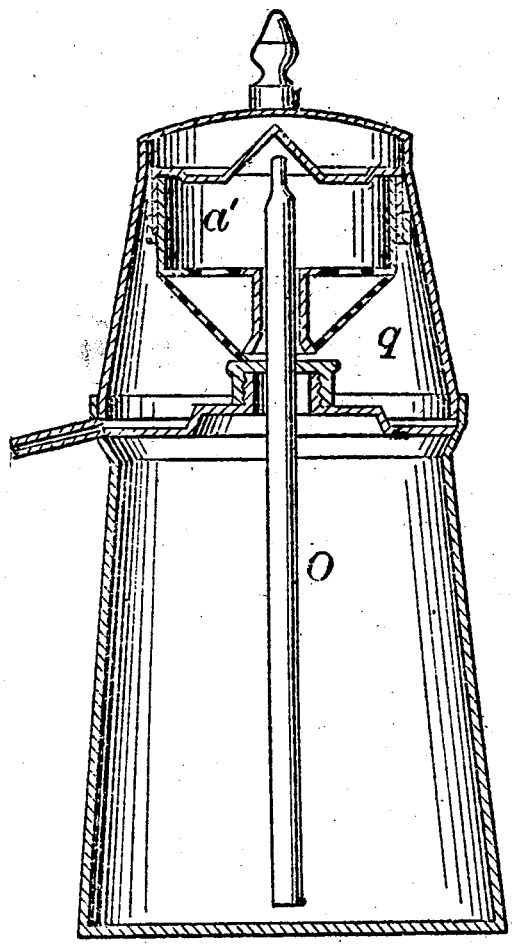
TAKEN FROM PATENT OFFICE REPORT
1865 VOL. III.
ONLY DRAWING ACCESSIBLE (1911)

UNITED STATES PATENT OFFICE.

HEINRICH A. ZOPFF, OF MILWAUKEE, WISCONSIN.

APPARATUS FOR MAKING COFFEE.

Specification forming part of Letters Patent No. 50,412, dated October 10, 1865.

*To all whom it may concern:*

Be it known that I, HEINRICH A. ZOPFF, of Milwaukee, in the county of Milwaukee and State of Wisconsin, have invented new and useful Improvements in Apparatus for Making Coffee; and I do hereby declare that the following is a full, clear, and exact description thereof, which will enable others skilled in the art to make and use the same, reference being had to the accompanying drawing, forming part of this specification.

The present invention relates to certain new and useful improvements in those apparatuses employed for making coffee in which steam is used to extract its aromatic qualities; and it consists in a novel arrangement of parts, by which the steam, as fast as generated, is passed into the chamber containing the coffee, with which it comes in contact, and, being condensed, penetrates through it, thereby entirely extracting its aroma, which finally passes out and into any suitable vessel or other receptacle to receive it.

In accompanying plate of drawing my improvements are represented, the figure thereof being a central longitudinal vertical section of the same.

$a\ a$, in the drawing represent the main or body portion of the apparatus, in which the water to be evaporated into steam is placed, having a cover, $b$, over its upper end, with an aperture, $c$, in its center, over the projection $d$ of which is screwed the coffee-receptacle $f$, made as follows:

$g$ is a hollow truncated cone, perforated on its sides, and attached by its smaller end to and upon the upper surface of the bottom or socket plate, $h$, by which it is screwed to the vessel $a$, as before described. To the upper end of the cone $g$ is secured the cylindrical portion $l$, over which tightly fits a cover, $m$, having its central part, $n$, made of a conical shape.

$o$ is a vertical tube passing through the center of the socket-plate $h$, and extending nearly to the bottom of the vessel $a$ at one end and to the upper part of the conical portion $n$ of the cover $m$ at the other, terminating in a conical-shaped nozzle, $p$, thereat.

Incasing the coffee-receptacle $f$, arranged as described, is an outer covering, $q$, fitting within the raised lip $r$, entirely surrounding the top plate or cover, $b$, of the pot, having groove or gutter, $s$, connecting with which a the point $t$ of the same is a delivery-spout, $t$ which may be made of any desired length an size.

When the apparatus is to be used, the coffee receptacle and its outer covering are first de tached from the same and water, either hot c cold, as may be desired, placed within the mai or principal receptacle $a$ of the apparatus, whe the coffee-receptacle is attached to the same as described, with the requisite and desire amount of coffee in its conical perforated chan ber $a'$, over which and upon its tube $o$ is place the perforated plate $x$, having a conical-shape funnel, $y$. The outer covering, $q$, is then place upon the apparatus, when it is set upon th stove or other heating device for generatin steam from the water in it, which, as fast a generated, passes out of the same through th aperture $z$, at or near the cover $b$, into the tub $o$, and up through the same, being delivere at its nozzle $p$ to the coffee-chamber $a'$, where as it becomes condensed by impinging agains the sides thereof, it flows through the apei tures of the perforated plate $x$, and, permeat ing the coffee under the same, extracts the arc ma therefrom, and then escapes into the chan ber of the outer covering, and, entering and fill ing its channels $s$, flows through the delivery pipe into any suitable vessel for receiving it This operation may be continued as long a may be deemed desirable, and until the requ site amount of coffee has been made, when th apparatus is removed from the stove or othe heating device and its parts detached fror each other and properly cleansed, ready fo use again.

By forming the top plate or cover of a con cal shape at its central portion, as described and represented in the drawing, a more eve diffusion of the condensed steam is secured t the coffee than would occur were it made of flat shape; and, moreover, the conical-shape nozzle to the steam-pipe prevents the con densed steam from entering the same, the ad vantages of which are evident.

I claim as new and desire to secure by Let ters Patent—

1. The general arrangement of the appara tus for making coffee herein described, th same consisting of the water-receptacle or steam-generator, a perforated coffee-receptacle, $a'$, provided with, or not, as may be desired, an outer covering or casing, $q$, and steam-tube $o$, connected together and operating substantially in the manner specified.

2. The conical-shaped end or nozzle to the steam-pipe $o$, substantially as and for the purpose specified.

HEINRICH A. ZOPFF.

Witnesses:
 R. H. VOIT,
 JACOB NUNNEMACHER.